US010506792B2

(12) United States Patent
Kronekvist et al.

(10) Patent No.: US 10,506,792 B2
(45) Date of Patent: Dec. 17, 2019

(54) ROTARY MILKING PARLOUR ARRANGEMENT

(71) Applicant: DELAVAL HOLDING AB, Tumba (SE)

(72) Inventors: Hans Kronekvist, Tumba (SE); Milan Bratt, Tumba (SE); David Landau, Tumba (SE); Klaus Aye, Tumba (SE)

(73) Assignee: DeLaval Holding AB, Tumba (SE)

( * ) Notice: Subject to any disclaimer, the term of this patent is extended or adjusted under 35 U.S.C. 154(b) by 364 days.

(21) Appl. No.: 15/316,195

(22) PCT Filed: Jun. 4, 2015

(86) PCT No.: PCT/SE2015/050650
§ 371 (c)(1),
(2) Date: Dec. 5, 2016

(87) PCT Pub. No.: WO2015/187086
PCT Pub. Date: Dec. 10, 2015

(65) Prior Publication Data
US 2017/0318778 A1 Nov. 9, 2017

(30) Foreign Application Priority Data
Jun. 5, 2014 (SE) ..................................... 1450690

(51) Int. Cl.
*A01K 1/12* (2006.01)
*A01J 5/007* (2006.01)

(52) U.S. Cl.
CPC ................ *A01K 1/126* (2013.01); *A01K 1/12* (2013.01); *A01J 5/007* (2013.01)

(58) Field of Classification Search
CPC ......... A01K 1/126; A01K 1/123; A01K 1/12; A01J 5/01; A01J 5/007
See application file for complete search history.

(56) References Cited

U.S. PATENT DOCUMENTS

| 3,835,814 A | 9/1974 | Jacobs et al. |
| 4,323,033 A | 4/1982 | Vosyka et al. |

(Continued)

FOREIGN PATENT DOCUMENTS

| DE | 10 2006 046767 A1 | 4/2008 | |
| EP | 0191517 A1 * | 8/1986 | ............ A01J 5/0175 |

(Continued)

OTHER PUBLICATIONS

International-Type Search Report, dated Feb. 4, 2015, from corresponding PCT application.

(Continued)

*Primary Examiner* — Jessica B Wong
(74) *Attorney, Agent, or Firm* — Young & Thompson

(57) ABSTRACT

A rotary milking parlor arrangement comprising an annular platform rotatably arranged around a rotary axis, a plurality of milking stalls arranged on the platform, a stationary floor surface surrounded by an inner edge portion of the annular platform. The floor surface is provided at a lower elevation than the platform surrounding it, such that a vertical opening is formed to a space under the platform between the edge portion of the platform and the floor surface. Modular units, located in the space under the platform, comprise a front wall element closing a part of said vertical opening, the modular units configured to be attached to a lower surface of the platform and to house at least one milking component in the space under the platform.

14 Claims, 4 Drawing Sheets

(56) References Cited

U.S. PATENT DOCUMENTS

| | | | |
|---|---|---|---|
| 5,361,722 A | 11/1994 | Tecza | |
| 5,960,738 A | 10/1999 | Sanford | |
| 6,336,424 B1* | 1/2002 | Kullberg | A01J 5/017 |
| | | | 119/14.2 |
| 8,646,412 B2 | 2/2014 | Eriksson | |
| 8,863,687 B2 | 10/2014 | Andersson | |
| 2004/0050331 A1 | 3/2004 | Hein et al. | |
| 2008/0210171 A1 | 9/2008 | Mader et al. | |
| 2009/0071810 A1 | 3/2009 | Hanson et al. | |
| 2009/0255472 A1 | 10/2009 | Ahrens | |
| 2013/0199449 A1* | 8/2013 | Daniel | A01J 5/007 |
| | | | 119/14.02 |

FOREIGN PATENT DOCUMENTS

| | | |
|---|---|---|
| RU | 2 515 035 C2 | 5/2014 |
| RU | 2 525 257 C2 | 8/2014 |
| SU | 1082352 A | 3/1984 |
| SU | 1493188 A1 | 7/1989 |
| SU | 1777728 A1 | 11/1992 |
| WO | 2006/068589 A1 | 6/2006 |
| WO | 2010/052156 A1 | 5/2010 |
| WO | 2011/098994 A2 | 8/2011 |

OTHER PUBLICATIONS

International Search Report, dated Aug. 24, 2015, from corresponding PCT application.
Supplementary International Search Report, dated Sep. 16, 2016, from corresponding PCT application.

* cited by examiner

ROTARY MILKING PARLOUR ARRANGEMENT

THE BACKGROUND OF THE INVENTION AND PRIOR ART

The present invention relates to a rotary milking parlour arrangement comprising an annular platform rotatably arranged around a rotary axis, a plurality of milking stalls arranged on the platform, a stationary floor surface arranged at the side of an edge portion of the platform, wherein the floor surface is located at a lower level than the platform such that a vertical opening is formed to a space under the platform between the edge portion of the platform and the floor surface, and a modular unit configured to be attached to the platform in a mounting position configured to house at least one milking component.

In a conventional rotary milking parlour, the cows walk on to an annular rotating platform and enter a milking stall. Teat cups are attached to the cows by means of an operator or a robot arm standing on a floor surface at the side of the platform. The platform usually rotates with a constant low speed in relation to the floor surface. The milking processes of the cows are finished and the cows leave the milking stalls before they have rotated one full revolution on the platform. The continuous flow of cows causes rotary parlours to have a high milking capacity.

Milking components such as milk meters, washing devices for the teat cups, pulsators, electrical control units and control valves of different kinds are attached on the rotary platform in the vicinity of the respective milking stalls. The environment on and around the platform is relative dirty and it is cleaned with water spoiled on the platform and surrounding surfaces with regular intervals. Furthermore, cows are heavy and a kick or a push from a cow can be very powerful. Consequently, it is important that the milking components have a mounting position protected from impurities, cleaning water and contact with the cows.

When an operator works on a floor surface at the side of a rotary platform, there is a risk that the operator gets caught in components which rotates with the platform.

SUMMARY OF THE INVENTION

The object of the present invention is to perform a modular unit of a rotary milking parlour which provides a protected mounting position of sensible milking components at the same time as it increase the safety for operators working at the side of the platform.

This object is achieved by the initially defined modular unit, which is characterised in that the modular unit comprises a front wall element closing a part of said vertical opening and that it is configured to be attached to a lower surface of the platform and to house the at least one milking component in the space under the platform. Since the front wall element has to cover the vertical opening to the space under the platform, it is very suitable to attach the modular unit to a lower surface of the platform in the vicinity of the edge portion. The modular unit may be attached to the lower surface of platform by means of a suitable connection member comprising bolts, screws or by welding.

The modular unit rotates together with the platform in a mounted state. The space under the platform is out of reach for the animals standing on the platform. Consequently, there is no risk that the animal on the platforms comes in contact with the milking component and makes damage on it. The surfaces around and on a rotary platform quickly become dirty and cleaning water is regularly spoiled on said surfaces. The vertical opening has a circle shape and it extends around the whole platform at the edge portion. The front wall element of the modular unit covers a part of circular opening to the space under the platform. Such a front wall element will at least make it difficult for dirt and washing water to penetrate into the space under the platform and reach the milking component in its mounting position under the platform. Thereby, dirt and washing water will not come in contact with and reduce the life time of the milking component. Furthermore, the front wall element provides a protective wall between components mounted on the platform an operator working at the side of the platform. Consequently, there is substantially no component on the platform which may come in contact with and get caught in an operator working at the side of the platform. Thus, the existence of the modular unit increases the safety for operators.

According to a preferred embodiment of the invention, the modular unit comprises a front wall element having a vertical extension between an upper end located at substantially the same level as the platform and a lower end located at a small distance above the stationary floor surface or at a lower level. Such a front wall element has a vertical extension such that it at least substantially closes the whole vertical opening in the vicinity of the milking component. For practical reasons, it could be suitable to leave a small gap between the lower end of the front wall element and the floor surface. Such a small gap does not significantly reduce the protective function of the front wall element. A floor surface under the platform may be located at a lower level than the floor surface at the side of the platform. In this case, the lower part of the front wall element may be positioned above the floor surface under the platform but below the floor surface at the side of the platform.

According to a preferred embodiment of the invention, the front wall element closes a part of the vertical opening formed at an inner edge portion of the annular platform. It is by several reasons appropriate to arrange milk lines and associated milking components at the inner edge portion of a platform. Therefore, it is suitable to arrange the modular unit at the inner edge portion of the platform. However, it is of course possible to arrange corresponding modular units at the outer edge portion of the platform and cover the circular-shaped vertical opening between the outer edge portion of the platform and a surrounding floor surface.

According to a preferred embodiment of the invention, the front wall element has an extension in one plane. There is substantially no risk that an operator gets caught in a plane outer surface of the front wall element. Furthermore, a plane outer surface does not collect dirt and it is easy to clean. Such a surface is easy to manufacture and results in a relatively low production cost.

According to a preferred embodiment of the invention, the front wall element comprises at least one aperture to the at least one milking component in the modular unit and an openable lid configured to cover said aperture when it is in a closed position. By means of an aperture and a lid in the front wall element, it is possible to obtain access to the milking components in the space under the platform in a simple manner.

According to an embodiment of the invention, said openable lid is a service lid which in an open position allows access to the at least one milking component in the modular unit. Milking components require services, repair or replacement at regular intervals. The modular unit may comprise a mounting beam or the like supporting one or several milking components.

According to an embodiment of the invention, said openable lid is a washing lid which in an open position allows access to a washing device by which it is possible to wash teat cups in the milking stall. It is suitable to arrange a washing device in a space behind a closed lid when it is not in use by hygienic reasons. In this position, it is protected from impurities from the animals and dirt when it is not in use. The washing device may comprise a support mechanism allowing a motion of the washing device from an inactive position in a space behind the washing lid to an active position in which it at least partly is located outside the front wall element of the modular unit.

According to an embodiment of the invention, said openable lid is pivotally arranged between a closed position and an open position around a pivot connection arranged at a lower side of the lid. In this case, the lid hangs downwards in an open position. Such an open position of the lid is stable and the aperture to the milking components is completely exposed. However, the lid may be pivotally arranged in other ways or movably arranged between the closed position and the open position by sliding, folding etc.

According to an embodiment of the invention, the modular unit comprises at least one inlet opening for a milk tube conducting milk from animals milked in the milking stall. The modular unit may comprise four inlet openings. Each inlet opening receives a milk tube conducting milk from a teat of the animal in the milking stall. Milking components such as milk meters, pulsators etc. are to be arranged in connection to such milk tubes. In order to arrange such milking components inside the modular unit, the milk tubes extend through such inlet openings in the front wall element of the modular unit. The modular unit may also comprise at least one inlet opening for a cleaning liquid line. The openings for the milk tubes and the cleaning liquid tubes may be defined by nipples. In this case a first part of the tubes are releasably connectable to the respective nipples at the outside of the modular unit which in turn are connected to a second part of the tubes on the inside of the modular unit.

According to an embodiment of the invention, the front wall element is formed by a metal sheet. Since the environment outside the front wall element is dirty and spoiled with washing water at regular intervals, the metal sheet is to have high strength and good corrosion resistance properties. Preferably, the metal sheet is made of stainless steel.

According to an embodiment of the invention, the modular unit comprises a substantially closed space in which the at least one milking component is mounted. Milking components obtain a protected mounting position in a position under the platform. They obtain an even more protected position in a closed space in a position under the platform. In this case, the modular unit may be formed as a cabinet. Alternatively, the modular unit has no closed space for mounting of the milking component in a position under the platform. Since the opening to the space under the platform is closed by the front wall element, the environment under the platform is relatively free from dirt and protected from cleaning water. In many cases, it is not necessary to arrange the milking components in a completely closed space under the platform since the environment in the space under the platform already is relatively clean.

The invention also relates to a rotary milking parlour arrangement comprising a plurality of modular unit arranged in a manner such that the front wall elements of the modular units together forms a continuous wall closing the whole circular-shaped vertical opening between the edge portion of the platform and the floor surface. In this case, substantially no dirt and cleaning water will penetrate into the space under the platform through any part of the vertical opening. Consequently, all milking components have a very protected mounting position in the respective modular units. Preferable, the front wall elements of the modular units form a continuous outer surface with no irregularities. If each front wall elements have a plane outer surface, the continuous wall comprises outer surfaces forming an obtuse angle in relation to each other. There is no risk that an operator gets caught in such an outer surface.

According to a preferred embodiment of the invention, rotary milking parlour comprises one modular unit for each milking stall on the platform. However, it is possible to construct a larger modular unit containing milking components for several milking stalls. The front wall elements of all modular units have one and the same width. The individual milking stalls have substantially the same dimension independent of the size of the platform. Thus, the same modular units can be used on platforms of different sizes.

According to a preferred embodiment of the invention, the modular units are connected to adjacent modular units by connection members allowing mounting of two adjacent modular units in at least two different angles in relation to each other. The number of modular units and the angle between adjacent modular units are to be changed for platforms of different kinds. In this case, connection members are used placing the modular units in different angles in relation to each other. Alternatively, the modular units are individually mounted in predetermined mounting positions on the platform in which they obtain a specific angle in relation to the adjacent modular units.

BRIEF DESCRIPTION OF THE DRAWINGS

The present invention is now to be explained more closely by means of preferred embodiments, which are disclosed as examples, and with reference to the attached drawings.

BRIEF DESCRIPTION OF A PREFERRED EMBODIMENT OF THE INVENTION

Figure 1:
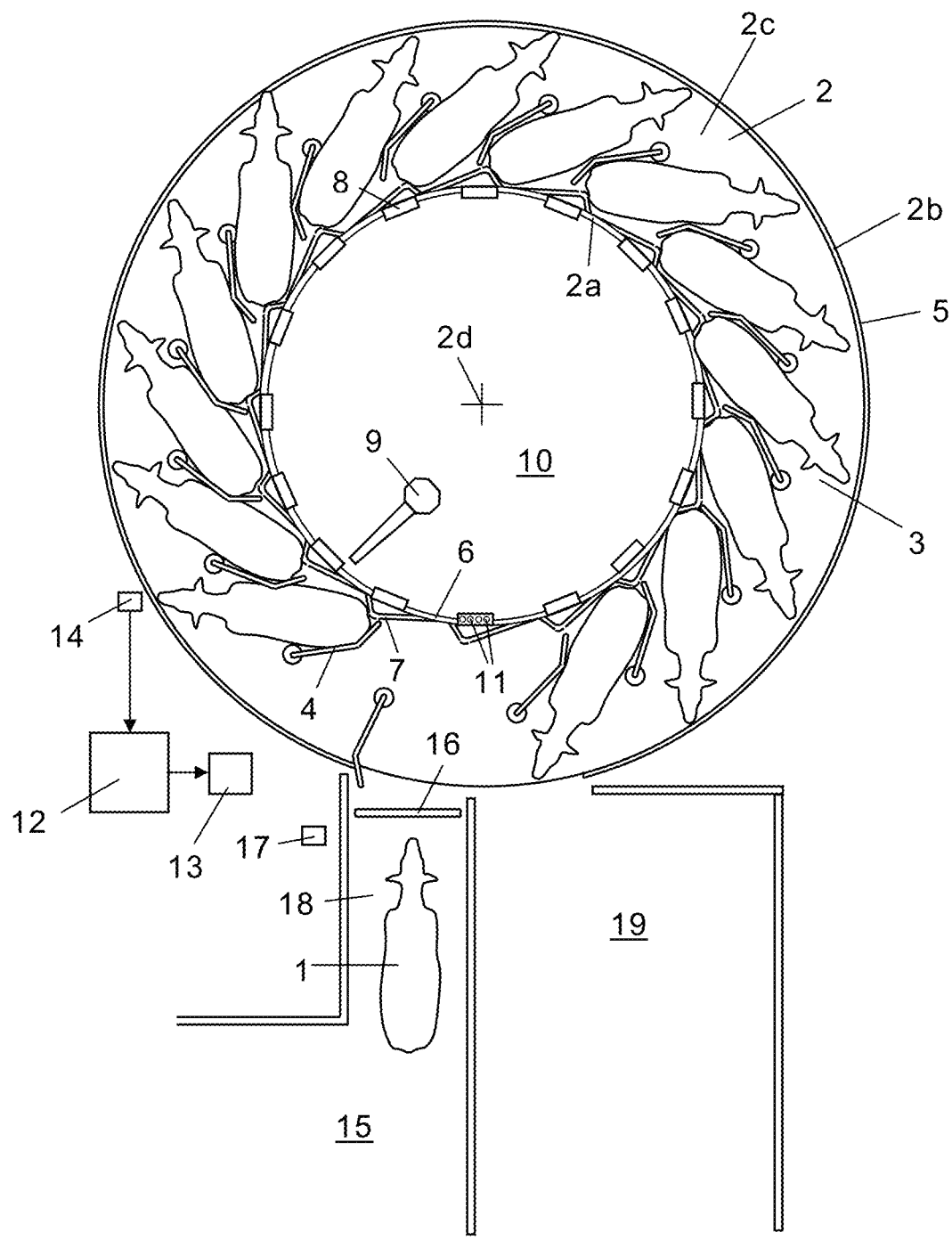
FIG. 1 shows a rotary milking parlour with milking stalls for milking of animals.

FIG. 1 shows a rotary milking parlour for milking of cows 1. The milking parlour comprises an annular platform 2 having an inner edge portion 2a and an outer edge portion 2b. The platform 2 rotates during operation around a vertical rotary axis 2d. The platform 2 has an upper surface 2c forming a support surface for the cows 1 to be milked on the platform 2. A plurality of rotatable fence members 4 are arranged on the upper surface 2c of the platform 2. The rotatable fence members 4 are used for dividing the platform 2 into milking stalls 3 for receiving individual cows 1 in predetermined milking positions. By the use of rotatable fence members 4, it is possible to position the cows very close together on the platform 2. An outer fence arrangement 5 is mounted around a common part of the outer periphery of the platform 2. An inner fence arrangement 6 and a rumprail 7 are arranged at the inner edge portion 2a of the platform 2. The object of the rumprail 7 is to position the rear part of the cows 1 in a predetermined milking position in the milking stalls 3. In this milking parlour, the cows 1 are arranged in a herringbone pattern with their heads at the outer edge portion 2b of the platform 2.

A milking robot arm 9 is arranged on a first stationary floor surface 10 located at the inner edge portion 2a of the platform 2. In this case, the first floor surface 10 covers the whole central opening of the annular platform 2. Each milking stall 3 comprises a teat cup magazine 8 adapted to hold four teat cups 10 in a parked position when they are not used. The teat cup magazines 8 are arranged at the inner edge portion 2a of the platform 2. In this case, the teat cup magazines 8 are arranged on one side of a cow 1 in a milking stall 3 and behind a cow 1 standing in an adjacent milking stall 3. When the cows 1 are arranged in a herringbone pattern on a platform 2, the above-mentioned space is normally empty. Therefore, it is very suitable to use this space for the teat cup magazines 8. A control unit 12 is adapted to control a schematically shown drive mechanism 13 which drives the platform 2. The drive mechanism 13 may comprise an electric motor, an integrated reduction gear box and a drive wheel mounted in contact with a lower surface of the platform 1. The drive mechanism 13 may be infinitely variable in speed in either a clockwise or counter-clockwise direction. A position sensor 14 is adapted to sense the rotational position of the platform 2 and to send a signal to the control unit 12 about the actual position of the platform 2.

The rotary milking parlour comprises a waiting area 15 in the vicinity of the platform 2. The waiting area 15 has an entrance gate 16 provided with an identification sensor 17 and an entrance passage 18 leading to the platform 2. The entrance gate 16 is arranged in a front position of the entrance passage 18. The identification sensor 17 identifies the cows 1 in a first position of the entrance passage 18. The rotary milking parlour comprises an exit area 19 in connection to the platform 2. The cows 1 enter the exit area 19 when they leave the platform 2.

Figure 2:
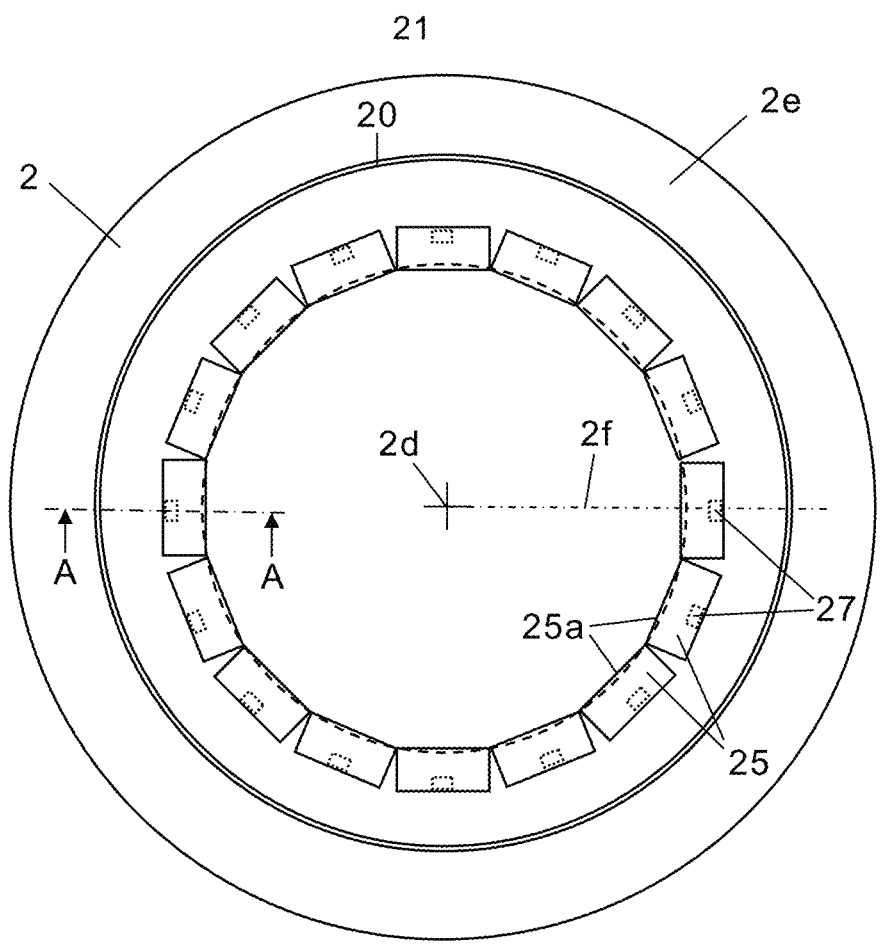
FIG. 2 shows a view from the underside of the platform in FIG. 1.
Figure 3:
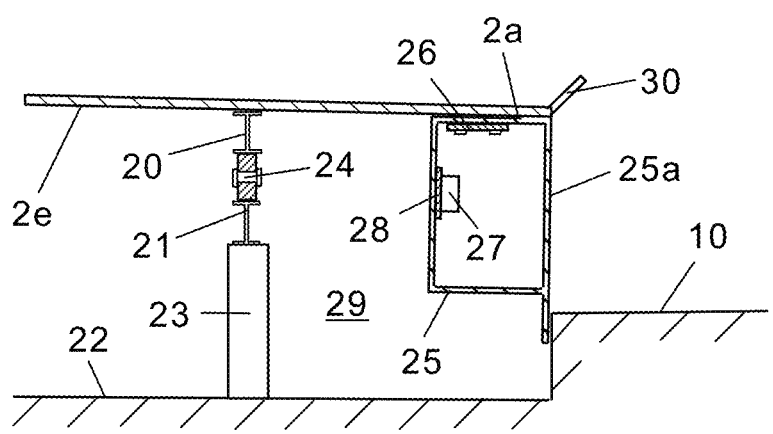
FIG. 3 shows a view in the plane A-A in FIG. 2.

FIG. 2 shows the platform 2 from below. The platform 1 has a lower surface 2e arranged between the inner edge portion 2a and the outer edge portion 2b. A first circular rail member 20 is fixedly attached to the lower surface 2e of the platform 2. The first circular rail member 20 may be directly or indirectly connected to the lower surface 2e of the platform 2. The first circular rail member 20 may, for example, be welded to the platform or indirectly connected to it via a suitable connection. The first rail member 20 is a part of a support arrangement for the platform 1. FIG. 3 shows some more components of the support arrangement of the platform 2. The support arrangement comprises a second circular rail member 21 arranged on a second floor surface 22 by means of a suitable number of support legs 23. The second stationary floor surface 22 under the platform 2 is located at a lower level than the first floor surface 10 in the central opening of the annular platform 2. The first rail member 20 and the second rail member 21 comprise each a beam with an I-shaped cross section. The second rail member 21 is arranged vertically below the first circular rail member 20. The support arrangement comprises a number of rollers 24 arranged in a vertical space between the first circular rail member 20 and the second circular rail member 21.

A number of modular units 25 are attached to the lower surface 2e of the platform 2 at the inner edge portion 2a. Each modular unit 25 is attached to the lower surface 2e of the platform 2 by means of suitable connection member 26. Each modular unit 25 supports a number of milking components used in a respective milking stall 2 on the platform. Each modular unit 21 is located substantially vertically below said milking stall 3. Thus, the numbers of modular units 25 are equal as the numbers of milking stall 3 on the platform 2. FIG. 3 shows one milking component in the form of an electrical control unit 27. The electric control unit 27 is mounted on a support beam 28 inside a closed space of a modular unit 25 in a position vertically below the platform 2. The modular units 25 comprise wall elements forming a closed space in the form of a cabinet encasing the electrical control unit 27.

Due to the level difference between the platform 2 and the first wall surface 10, a vertical opening is formed between the inner edge portion 2a of the platform 2 and the first floor surface 10. Said vertical opening extends around the whole circumference at the inner edge portion 2a of the platform 2 and form a circle shape. The vertical opening leads to a space 29 under the platform 2. Each modular unit 25 comprises a front wall element 25a arranged substantially vertically below the inner edge portion 2a of the platform 2. The front wall elements 25a has a substantially plane outer surface. Each front wall element 25a has an extension between an upper part connected to the inner edge portion 2a of the platform 2 and a lower part located at a lower level than the level of the first floor surface 10. Thus, each front wall element 25a covers the opening in a vertical direction. Each front wall element 25a has a width such they together form a continuous wall extending around the whole circular-shaped opening. A protective plate member 30 is arranged at the inner edge portion 2a of the platform 2. The protective plate member 30 may be a metal sheet extending obliquely upwards from a lower edge portion to an upper edge portion. The object of the protective member 30 is to protect operators working on the floor surface 10 in the centre of the platform 2. Furthermore, it prevents cows 1 from stepping outside the platform 2 and it prevents impurities to fall down from the platform 2 to the first floor surface 10.

The size of individual milking stalls 3 on a rotary platform is substantially the same independent of the number of the milking stalls 3 on a platform 2. The front wall elements 25a of the modular units 25 have a width such that it is possible to arrange the front wall elements 25a of the modular units 25 in a connected state such that their plane front wall elements 25a forms a regular polygon which substantially corresponds to the circle-shaped inner edge portion of the platform 2. Thus, the front wall elements 25a of the modular units 25 together form a continuous wall closing the whole vertical opening between the edge portions 2a of the platform 2 and the stationary floor surface 10.

Figure 4:
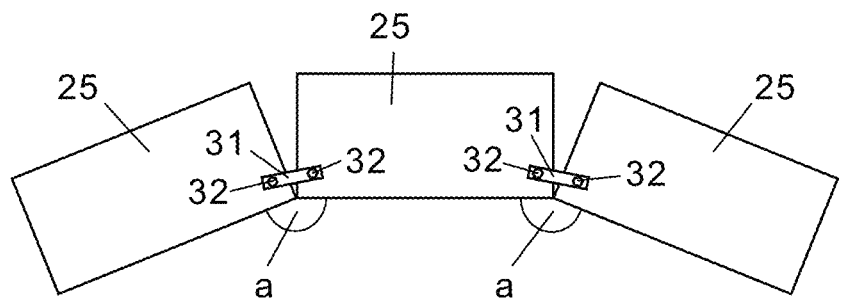
FIG. 4 shows a number of modular units in a connected state.

The connected front wall elements 25a cover the whole circular-shaped opening at an inner edge portion 2a of the platform 2. However, by changing the number of modular units 25 and the angle between adjacent modular units 25 it is possible to use the same modular units 25 for platforms 2 of different sizes. FIG. 4 shows a number of modular units 25 linked together by means of a connection comprising an elongated plate-shaped connection member 31. The elongated connection member 31 comprises end portions with holes 32 for attachment of screws, bolts, rivets or the like in corresponding holes in the modular units 25. By using elongated connection members 31 of different length between the holes 32, it is possible to arrange the modular units 25 in different angles a in relation to adjacent modular units 25.

Figure 5:
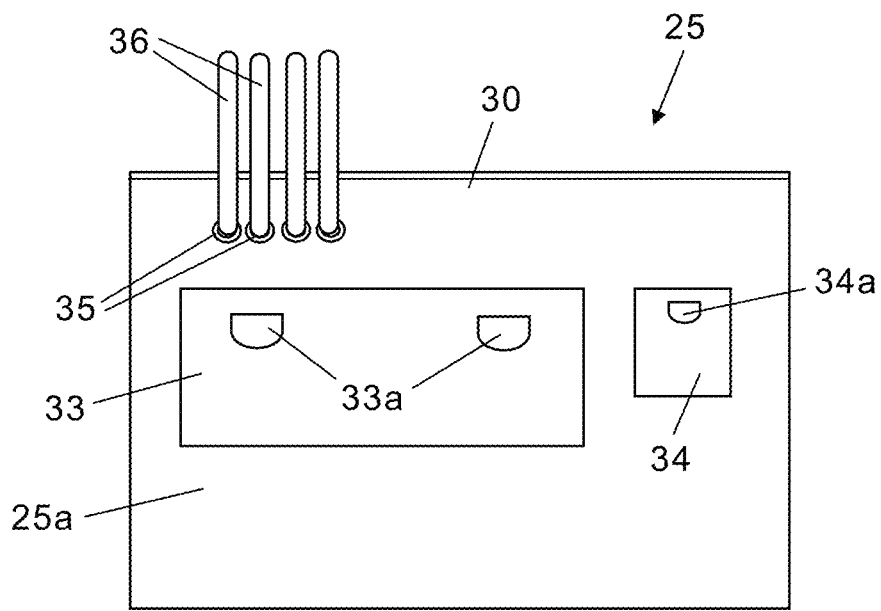
FIG. 5 shows a front view of a modular unit with two lids in a closed position.
Figure 6:
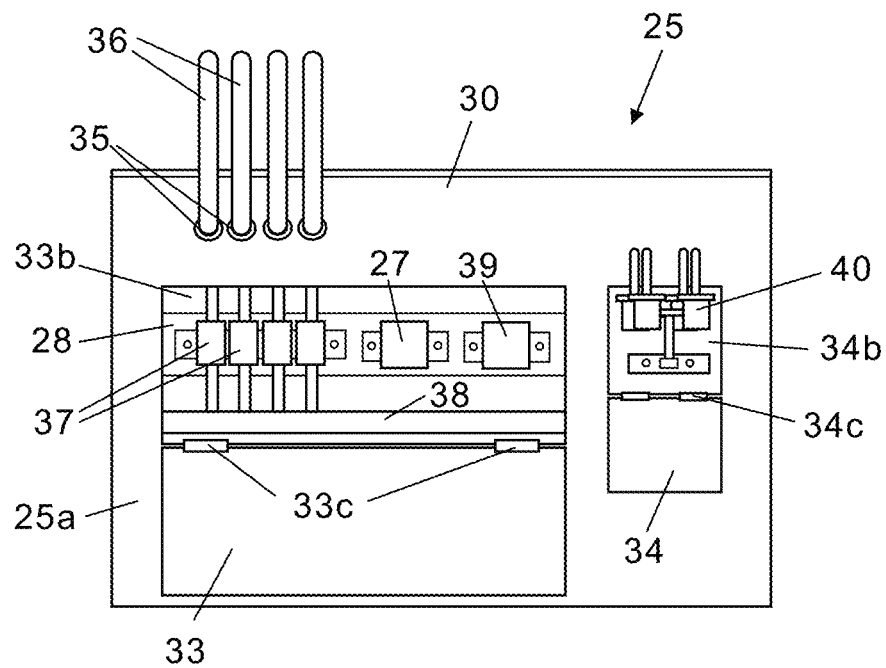
FIG. 6 shows the modular unit in FIG. 5 when the lids are in an open position and FIG. 7 shows an alternative embodiment of a modular unit.

FIGS. 5 and 6 show a front view of one modular unit 25. The front wall element 25a comprises, at an upper portion, four inlet openings 35 for milk tubes 36 conducting milk from the teat cups in the milking stall 3. The front wall element 25a comprises two openable lids in the form of a service lid 33 and a washing lid 34. FIG. 5 shows the lids 33, 34 in a closed position and FIG. 6 shows the lids 33, 34 in an open position. Each lid 33, 34 comprises at least one grip member 33a, 34a by which is possible to grip and manually open and close the lids 33, 34. Each lid 33, 34 exposes in the open position an aperture 33b, 34b to the inner space of the modular unit 25. Each lid 33, 34 is pivotally arranged between the closed position and the open position by means of pivot elements 33c, 34c arranged at a lower side of the lids 33, 34. Such an arrangement of the pivot elements result in that the lid 33, 34 will hang downwards in a stable open position. The lids 33, 34 form in the closed position a part of the front wall element 25a. The lids 33, 34 are to be in a closed position when milking operations proceeds in the milking stalls 3 on the platform 2.

When the service lid 33 is in the open position, a service aperture 33b is exposed in the front wall element 25a. The service aperture 33b provides access to milking components mounted inside the modular unit 25. A mounting beam 28 is arranged in the inner space of the modular unit 25. The mounting beam 28 supports a number of milking components in the milking stall 3. In this case, the milking components comprise four milk meters 37. The milk meters 37 measure the milk flow in the respective milk tubes 36 conducting milk from the teat cups 11 in the milking stall 3 to a main milk line 38 which collects milk from several milking stalls 3 on the platform 2. Another milking component is the already defined electrical control unit 27. A further milking component is a washing valve 39 which controls the supply of washing water to a washing device 40 by which it is possible to wash the teat cups 11 in the milking stall 3. The washing device 40 is mounted in the inner space of the modular unit 25 behind the washing lid 34. Other milking components such as pulsators for the individual teat cups may also be mounted in the inner space of the modular unit 25. During service, repair and replacement of the milking components 27, 37, 39 in the modular unit 25, the service lid is moved to an open position. The service aperture 33b is exposed and an operator allows access to the milking components inside the modular unit 25 in a simple manner.

When the washing lid 34 is in the open position, the washing aperture 34b is exposed in the front wall element 25a. The washing aperture 34b provides access to an inner space of modular unit 25 in which the washing device 40 is arranged in an inactive state. The washing device 40 comprises four candle-shaped members mounted on a support mechanism. When it is time to wash the teat cups in a milking stall 3, the washing lid 34 is moved to the open position. The washing device 40 is moved out from the washing aperture and turned to a washing position in which the candle-shaped members have a vertical extension with the free ends directed upwardly. Thereafter the teat cups 11 are placed on the candle-shaped members. The washing valve 39 is set in an open position and washing water is supplied to the candle-shaped members and the teat cups 11.

When the washing process of the teat cups 11 is finished, the teat cups 11 are brought to the storing device 8 in the milking stall 3. The washing device 40 is moved back to the inner space of the modular unit 25 and the washing lid 34 is closed. The washing device 40 has a protected position inside the modular unit 25 under the platform 2 in the inactive state when milking processes proceeds in the milking stalls 3 on the platform 2.

The environment on and at the side of a rotary platform 2 is relative dirty. The platform 2 and the surfaces around the platform 2 are spoiled with water with regular intervals. Furthermore, kicks and pushes from the cow can be very powerful. Consequently, it is important that the milking components 27, 37, 39, 40 have a protected mounting position on the platform 2. The modular unit 25 provides a closed inner space which is arranged in a position under the platform 2. The milking components are here out of reach of the cows 1 standing on the platform 2. Furthermore, the front wall elements 25a of the modular units 25 cover the whole opening between the inner edge portion 2a of the platform 2 and the floor surface 10 in the centre of the platform 2 such that dirt and washing water can not penetrate into the space 29 under the platform 2 via said opening. Consequently, the milking components are also protected from dirt and washing water in the modular units 25.

Since the front surfaces 25a of the modular units 25 have a substantially plane outer surface, they form in a connected state a wall in the form of a regular polygon. Such a wall is free from projecting portions. The risk that an operator working on the floor surface 10 gets caught is here substantially eliminated. The front surfaces 25a of the modular unit 25 also protects other components arranged under the platform 2 such as the rollers 24 and the other components 20-23 of the support arrangement of the rotary platform 2. Since the modular unit 25 can be used in platforms of different sizes, it can be manufactured in relatively large quantities to a relatively low cost.

Figure 7:
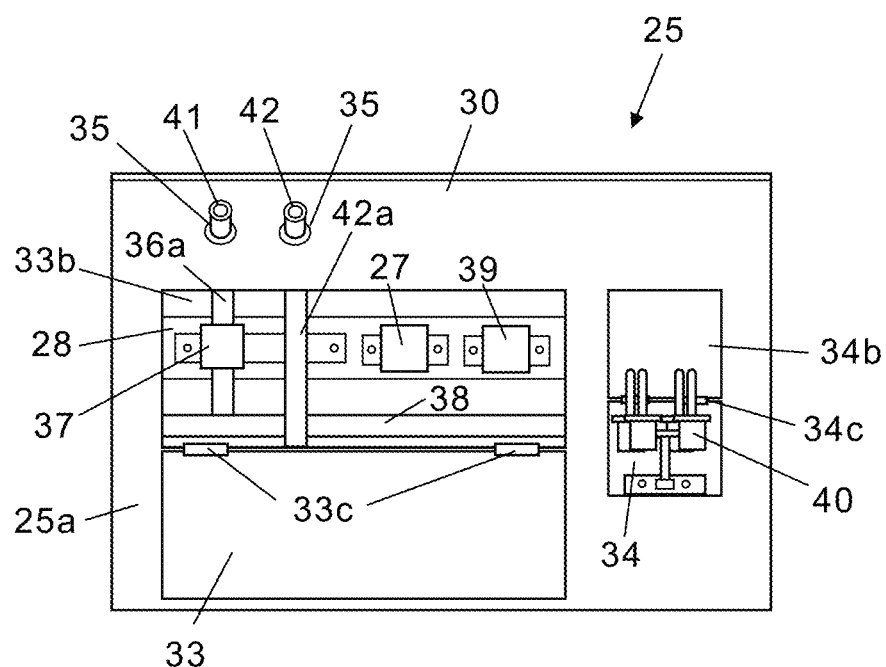

FIG. 7 shows an alternative embodiment of the modular unit 25. The front wall element 25a of this embodiment of the modular unit 25 comprises, at an upper portion, a first nipple 41 defining an opening 35 through the front wall element 25a. An end portion of a flexible milk tube conducting milk from all teat cups in the milking stall 3 is configured to be attached to the first nipple 41. A milk line 41a receives the milk from the first nipple 41 at the inside of the modular unit 25. The front wall element 25a comprises, at an upper portion, a second nipple 42 defining a second opening 35 through the front wall element 25a. An end portion of a flexible tube conducting cleaning liquid is configured to be attached to the second nipple 42. A cleaning liquid line 42a receives the cleaning liquid from the second nipple 42 at the inside of the modular unit 25. In this case, the washing device 40 is mounted on the inner surface of the washing lid 34. When the washing lid 34 has been pivoted from a closed position to an open position it hangs downwardly in contact with the front wall element 25a and with the washing device 40 in an active position in which it is ready to be used.

The invention is not restricted to the described embodiment but may be varied freely within the scope of the claims.

The invention claimed is:
1. A rotary milking parlour arrangement, comprising:
an annular platform (2) configured to rotate about a rotary axis (2d), the annular platform (2) delimited by an annular outer edge and an annular inner edge;

a plurality of milking stalls (3) arranged on a surface of the annular platform (2) extending between the annular outer edge and the annular inner edge;

a stationary floor surface (10) inside an area encircled by the annular inner edge of the annular platform, an outer perimeter of the stationary floor surface (10) running adjacent to an annular inner edge portion (2a) of the annular platform (2), the stationary floor surface (10) having a lower elevation than the annular platform (2) such that a space (29) is formed under the annular platform (2) between the inner edge portion (2a) of the annular platform (2) and the stationary floor surface (10), and a vertical gap between the inner edge portion (2a) and the stationary floor surface (10) forms a vertical opening into the space; and a modular unit (25) configured to be attached to a lower surface (2e) of the annular platform (2) in a mounting position at the inner edge portion of the annular platform (2) and in the space under the surface of the annular platform (2), the modular unit (25) configured to house at least one milking component (27, 37, 39, 40), wherein the modular unit (25) comprises a front wall element (25a) for closing at least a part of said vertical opening, the front wall element (25a) having a vertical extension that extends, from an upper end at the inner edge portion (2a) at substantially a same level as the annular platform (2), downward in a direction toward the stationary floor surface (10), and wherein the modular unit (25) is configured to house the at least one milking component (27, 37, 39, 40) in the space (29) under the surface of the annular platform (2).

2. The rotary milking parlour arrangement according to claim 1, wherein the vertical extension of the front wall element (25a) extends from the upper end at substantially the same level as the annular platform (2) to a lower end located in the space under the surface of the annular platform (2) at a level lower than that of the stationary floor surface (10).

3. The rotary milking parlour arrangement according to claim 1, wherein the front wall element (25a) comprises at least one aperture (33b, 34b) to the at least one milking component in the modular unit (25) and an openable lid (33, 34) configured to cover said aperture (33b, 34b) when the openable lid is in a closed position.

4. The rotary milking parlour arrangement according to claim 3, wherein said openable lid is a service lid (33) which in an open position allows access to the at least one milking component in the modular unit (25).

5. The rotary milking parlour arrangement according to claim 3, wherein said openable lid is a washing lid (34) which in an open position allows access to a washing device (40) by which for washing teat cups (11) in a milking stall (3).

6. The rotary milking parlour arrangement according to claim 3, wherein said openable lid (33, 34) is pivotally arranged between a closed position and an open position around a pivot connection (33c, 34c) arranged at a lower side of the lid (33, 34).

7. The rotary milking parlour arrangement according to claim 1, wherein the modular unit (25) comprises at least one inlet opening (35) for a milk tube (36) that conducts milk from an animal in the milking stall (3).

8. The rotary milking parlour arrangement according to claim 1, wherein the modular unit (25) comprises at least one inlet opening (35) for a cleaning tube (36) that conducts cleaning liquid.

9. The rotary milking parlour arrangement according to claim 1, wherein the front wall element (25a) is formed by a metal sheet.

10. The rotary milking parlour arrangement according to claim 1, wherein the modular unit (25) comprises a substantially closed space in which the at least one milking component (27, 37, 39, 40) is mounted.

11. The rotary milking parlour arrangement according to claim 1, wherein a plurality of modular units (25) are arranged in a manner such that the front wall elements (25a) of the modular units (25) together form a continuous wall closing an entirety of the vertical opening between the inner edge portion (2a) of the annular platform (2) and the stationary floor surface (10).

12. The rotary milking parlour arrangement according to claim 11, each milking stall on the annular platform includes one modular unit (25) of the plurality of modular units (25).

13. The rotary milking parlour arrangement according to claim 11, wherein the front wall elements (25a) of all the modular units (25) have one and the same width.

14. The rotary milking parlour arrangement according to claim 11, wherein each one of the plurality of modular units (25) is connected to an adjacent one of the plurality of modular units (25) by connection members (31, 32) configured to permit mounting of two adjacent modular units (25) in at least two different angles in relation to each other.

* * * * *